United States Patent
Mizusawa (10) Patent No.: US 9,919,752 B2
(45) Date of Patent: Mar. 20, 2018

(54) ELASTIC CRAWLER

(71) Applicant: BRIDGESTONE CORPORATION, Chuo-ku, Tokyo (JP)

(72) Inventor: Takashi Mizusawa, Yokohama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/344,766

(22) Filed: Nov. 7, 2016

(65) Prior Publication Data
US 2017/0151987 A1    Jun. 1, 2017

(30) Foreign Application Priority Data

Nov. 27, 2015 (JP) .................. 2015-231669

(51) Int. Cl.
*B62D 55/24* (2006.01)
(52) U.S. Cl.
CPC .................. *B62D 55/244* (2013.01)
(58) Field of Classification Search
CPC .................................. B62D 55/244
USPC ....... 305/165, 166, 167, 170, 171, 177, 178, 305/183
See application file for complete search history.

(56) References Cited

U.S. PATENT DOCUMENTS

| | | | | |
|---|---|---|---|---|
| 3,480,339 A * | 11/1969 | Kell | ....................... | B62D 55/24 305/166 |
| 6,203,125 B1 * | 3/2001 | Arakawa | ................ | B62D 55/24 305/166 |
| 7,083,242 B2 * | 8/2006 | Piou | ..................... | B62D 55/244 305/166 |
| 2002/0163252 A1 * | 11/2002 | Tsuru | ................... | B62D 55/244 305/167 |
| 2002/0195877 A1 * | 12/2002 | Tsuru | ................... | B62D 55/244 305/170 |
| 2011/0169324 A1 * | 7/2011 | Ijiri | ...................... | B62D 55/244 305/142 |

FOREIGN PATENT DOCUMENTS

JP            2013107472 A        6/2013

* cited by examiner

*Primary Examiner* — S. Joseph Morano
*Assistant Examiner* — Jean Charleston
(74) *Attorney, Agent, or Firm* — Kenja IP Law PC (57) ABSTRACT

An elastic crawler includes an endless elastic body; cores that each include a core body and a pair of protrusions; lugs, on the outer circumferential side of the elastic body, each disposed so as to avoid a crawler circumferential direction area corresponding to at least a portion of the core in the crawler circumferential direction; and grooves, on the crawler inner circumferential surface, each positioned outward in the crawler width direction from the pair of protrusions in a crawler circumferential direction area corresponding to the core, each of the grooves being recessed relative to crawler inner circumferential surface portions adjacent to the groove on both sides in the crawler circumferential direction.

3 Claims, 6 Drawing Sheets

ELASTIC CRAWLER

CROSS-REFERENCE TO RELATED APPLICATION

This application claims priority to and the benefit of Japanese Patent Application No. 2015-231669 filed Nov. 27, 2015, the entire contents of which are incorporated herein by reference.

TECHNICAL FIELD

This disclosure relates to an elastic crawler.

BACKGROUND

A known example of an elastic crawler used in agricultural machinery (such as combines) and other traveling equipment includes a groove (partitioning groove) on the inner circumferential surface of the crawler between cores that are adjacent in the crawler circumferential direction (for example, see JP 2013-107472 A (PTL 1)). PTL 1 asserts that providing the groove suppresses the resistance to bending (bending resistance) in the crawler circumferential direction when the elastic crawler is wound around a drive wheel or idle wheel. Suppressing the bending resistance in the crawler circumferential direction achieves the effects of fuel efficiency and a reduced load on the body of the traveling equipment.

CITATION LIST

Patent Literature

PTL 1: JP 2013-107472 A

SUMMARY

The rigidity of the metal core is much higher, however, than the rigidity of the elastic solid, such as rubber, that constitutes the elastic body of the elastic crawler. Therefore, in the elastic crawler of PTL 1, the rigidity in the crawler thickness direction in a crawler circumferential direction area corresponding to the core is significantly higher than the rigidity in the crawler thickness direction in a crawler circumferential direction area between the cores. Therefore, while the track rollers are passing over the track roller rolling surface provided on the inner circumferential surface of the crawler, the track rollers sink in each time they pass over the crawler circumferential direction area between the cores, where the rigidity in the crawler thickness direction is low, causing the track rollers to vibrate vertically. Hence, there is room for improvement in the ride comfort.

In the elastic crawler of PTL 1, one approach could, for example, be to eliminate the aforementioned groove (partitioning groove) provided on the crawler inner circumferential surface between cores that are adjacent in the crawler circumferential direction, increasing the rigidity in the crawler thickness direction at the crawler circumferential direction area between the cores and suppressing vertical vibration when the track rollers pass over that area. In this case, however, the above-described effect of suppressing the bending resistance in the crawler circumferential direction can no longer be achieved.

It would therefore be helpful to provide an elastic crawler that can reduce vibration while reducing the bending resistance in the crawler circumferential direction.

An elastic crawler according to this disclosure includes an endless elastic body; a plurality of cores embedded in the elastic body and arranged at intervals in a crawler circumferential direction, each core including a core body extending in a crawler width direction and a pair of protrusions protruding from the core body towards a crawler inner circumferential side and facing each other in the crawler width direction; lugs, on an outer circumferential side of the elastic body, each disposed so as to avoid a crawler circumferential direction area corresponding to at least a portion of the core in the crawler circumferential direction; and grooves, on a crawler inner circumferential surface, each positioned outward in the crawler width direction from the pair of protrusions in a crawler circumferential direction area corresponding to the core, each of the grooves being recessed relative to crawler inner circumferential surface portions adjacent to the groove on both sides in the crawler circumferential direction.

According to the elastic crawler of this disclosure, vibration can be reduced while reducing the bending resistance in the crawler circumferential direction.

The elastic crawler of this disclosure may further include track roller rolling portions each provided on the elastic body inside or outside in the crawler width direction from the pair of protrusions, an end face of each of the track roller rolling portions on the crawler inner circumferential side forming a track roller rolling surface; each of the track roller rolling portions may protrude more towards the crawler inner circumferential side than a crawler inner circumferential surface portion that is outward, in the crawler width direction, from the track roller rolling portion; and a portion of each of the grooves may be formed by recessing the track roller rolling portion.

According to this structure, the bending resistance in the crawler circumferential direction can be further reduced.

In the elastic crawler of this disclosure, a portion of each of the grooves may be provided in the crawler inner circumferential surface portion that is outward, in the crawler width direction, from the track roller rolling portion.

According to this structure, the bending resistance in the crawler circumferential direction can be further reduced.

According to this disclosure, an elastic crawler that can reduce vibration while reducing the bending resistance in the crawler circumferential direction can be provided.

BRIEF DESCRIPTION OF THE DRAWINGS

In the accompanying drawings:

FIGS. 1A and 1B illustrate an elastic crawler according to Embodiment 1, where

FIGS. 4A and 4B illustrate an elastic crawler according to Embodiment 2, where

DETAILED DESCRIPTION

Embodiments of a rubber crawler according to this disclosure are exemplified below in detail with reference to FIGS. 1A to 6C.

Embodiment 1

FIGS. 1A to 3C illustrate an elastic crawler according to Embodiment 1.

The elastic crawler of this embodiment is configured to be endless and is wound around a sprocket (not illustrated) acting as a drive wheel that transmits the rotational driving force to the elastic crawler 1, an idler (not illustrated) acting as an idling wheel, and a plurality of track rollers 100 disposed between the sprocket and the idler to guide the elastic crawler.

The elastic crawler of this embodiment includes an endless elastic body 10 formed from an elastic solid such as rubber.

Hereinafter, for the sake of explanation, the width direction, circumferential direction, and thickness direction of the elastic crawler (which respectively are the same as the width direction, circumferential direction, and thickness direction of the elastic body 10) are referred to respectively as the roller width direction WD, crawler circumferential direction CD, and crawler thickness direction TD. Furthermore, the inner circumferential surface, outer circumferential surface, inner circumferential side, and outer circumferential side of the elastic crawler (which respectively are the same as the inner circumferential surface, outer circumferential surface, inner circumferential side, and outer circumferential side of the elastic body 10) are referred to respectively as the crawler inner circumferential surface, crawler outer circumferential surface, crawler inner circumferential side, and crawler outer circumferential side.

On the outer circumferential side, the elastic body 10 includes a plurality of lugs 2 that contact the road surface. The lugs 2 in the example in FIGS. 1A and 1B have a shape extending straight in the crawler width direction WD, but the lugs 2 may have a different shape instead. A plurality of metal cores 5 disposed at intervals in the crawler circumferential direction CD and a plurality of cords 8 disposed on the crawler outer circumferential side of the cores 5 are embedded in the elastic body 10.

Figure 1A:
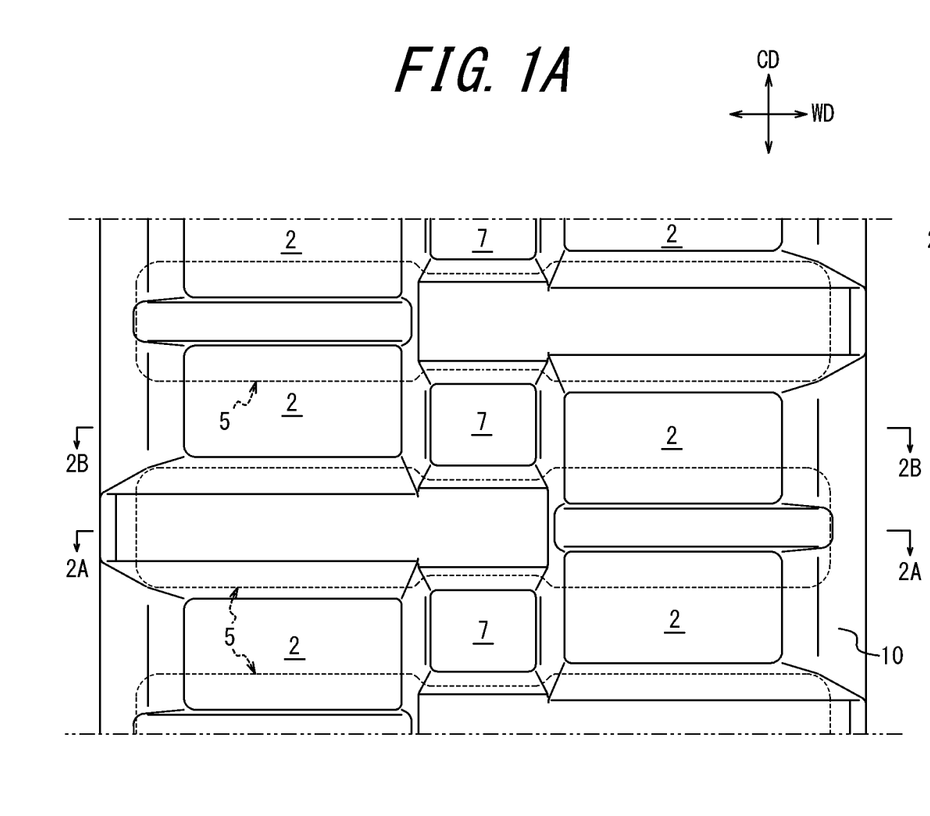
FIG. 1A is a plan view illustrating the outer circumferential surface of the crawler.
Figure 1B:
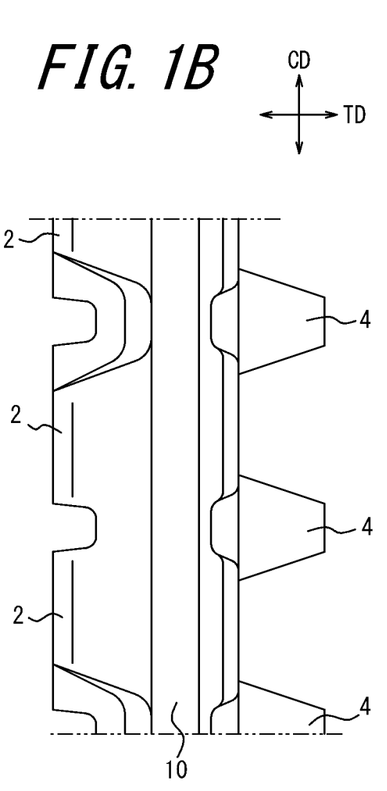
FIG. 1B is a side view of the elastic crawler in FIG. 1A from the right side.
Figure 2A:
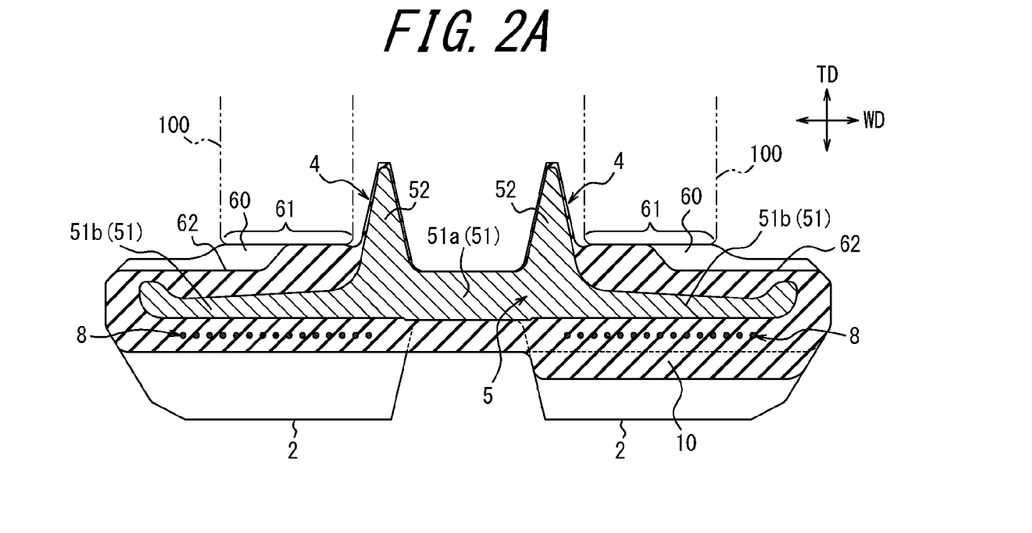
FIG. 2A is a cross-sectional view in the crawler width direction along the 2A-2A line of the elastic crawler in FIG. 1A.
Figure 2B:
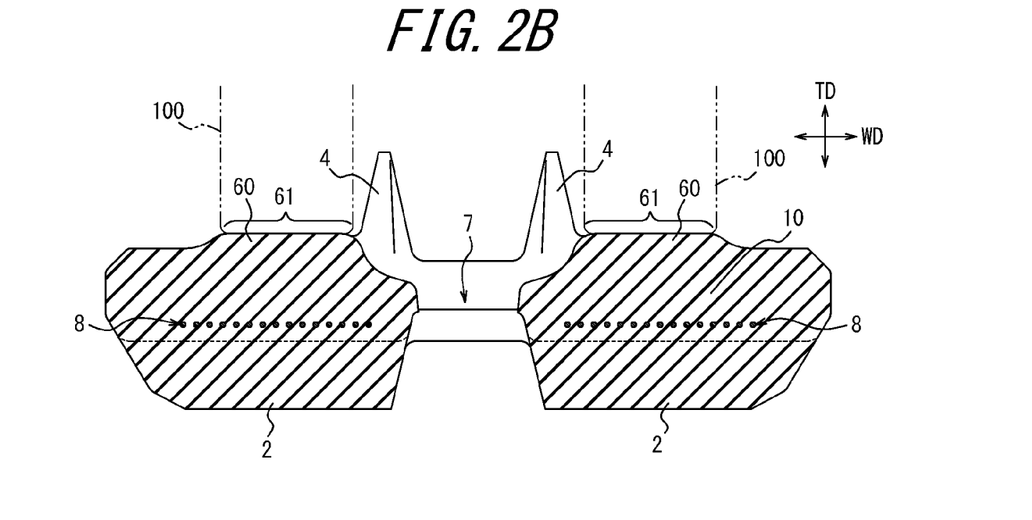
FIG. 2B is a cross-sectional view in the crawler width direction along the 2B-2B line of the elastic crawler in FIG. 1A.

As illustrated in FIG. 2A, each core 5 includes a core body 51, roughly shaped as a flat plate, extending in the crawler width direction WD across the center of the elastic crawler in the crawler width direction WD and a pair of protrusions 52, on either side of the center of the elastic crawler in the crawler width direction WD, that protrude from the core body 51 towards the crawler inner circumferential side (upward in FIG. 2A) and face each other in the crawler width direction WD. The core body 51 includes a core body central portion 51a that connects the outer edges, in the crawler width direction, of the pair of protrusions 52 and a pair of core body wings 51b that extend from the edges, in the crawler width direction WD, of the core body central portion 51a (and therefore from the outer edges, in the crawler width direction WD, of the protrusions 52) outward in the crawler width direction WD. Projections 4 are provided on the crawler inner circumferential surface. The projections 4 are formed by covering the protrusions 52 of the core 5 with an elastic film that forms part of the elastic body 10. In other words, the projections 4 that protrude towards the crawler inner circumferential side are constituted by the protrusions 52 of the cores 5 and the elastic film covering the protrusions 52.

The cords 8 restrict extension of the elastic crawler in the crawler circumferential direction CD while assisting with smooth rotation of the elastic crawler based on the driving force received from the sprocket. The plurality of cords 8 extend in the crawler circumferential direction CD, are arranged relative to each other in the crawler width direction WD, and enclose portions of the cores 5 that are outward in the crawler width direction WD from the pair of protrusions 52. The cords 8 may, for example, be configured by metal (such as steel) or organic fibers.

The elastic crawler of this example includes sprocket holes 7, into which the sprocket teeth enter, that are located between the cores 5 in the crawler circumferential direction CD, at positions in the crawler width direction WD corresponding to a portion between the pair of protrusions 52 of the core 5. The sprocket holes 7 pass through the elastic crawler in the crawler thickness direction TD in this example but may instead be formed as depressions that do not pass through the elastic crawler in the crawler thickness direction TD.

As illustrated in FIGS. 2A, 2B, and 3A to 3C, a pair of track roller rolling surfaces 61 over which the track rollers 100 pass are formed on the crawler inner circumferential surface, further outward in the crawler width direction WD than the pair of protrusions 52 (and therefore further outward in the crawler width direction WD than the pair of projections 4). In this example, the track roller rolling surfaces 61 extend in the crawler width direction WD from the outer edge, in the crawler width direction WD, of the projection 4 to a position that is inward, in the crawler width direction WD, from the crawler width direction edges of the crawler inner circumferential surface. The track roller rolling surface 61 is the end face, on the crawler inner circumferential side, of a track roller rolling portion 60, which is a portion of the elastic body 10. The track roller rolling portion 60 protrudes more towards the crawler inner circumferential side than does the crawler inner circumferential surface portion that is adjacent to the track roller rolling portion 60 outward in the crawler width direction WD.

In this embodiment, each lug 2 is disposed so as to avoid a crawler circumferential direction CD area that corresponds to at least a portion (in this example, a portion) of the core 5 in the crawler circumferential direction CD. In greater detail, in this example, as illustrated in FIGS. 1A to 3C, each lug 2 is disposed so as to avoid an intermediate portion that straddles the center, in the crawler circumferential direction CD, of the core 5. The lug 2, however, may be disposed so as to avoid a crawler circumferential direction CD area that corresponds to a portion of the core 5 that is on one side, in the crawler circumferential direction CD, of the center of the core 5 in the crawler circumferential direction CD. Alternatively, the lug 2 may be disposed so as to avoid a crawler circumferential direction CD area that corresponds to the entire core in the crawler circumferential direction CD. Stating that the lug 2 "is disposed so as to avoid" the crawler circumferential direction CD area refers to the base of the lug 2 (the edge on the crawler inner circumferential side) being disposed within a crawler circumferential direction CD area that excludes the aforementioned crawler circumferential direction CD area.

In this example, as illustrated in FIGS. 1A to 3C, the crawler circumferential direction area corresponding to the surface of the lug 2 on the crawler outer circumferential side (the ground contact surface) and the crawler circumferential direction area corresponding to the core 5 partially overlap.

Figure 3A:
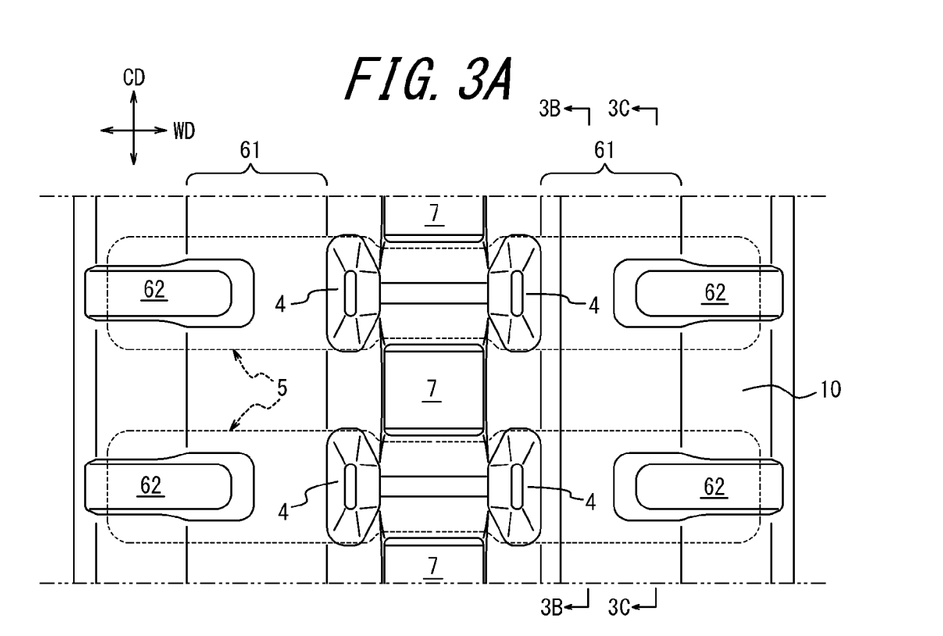
FIG. 3A is a plan view illustrating the inner circumferential surface of the elastic crawler in FIGS. 1A and 1B.
Figure 3B:
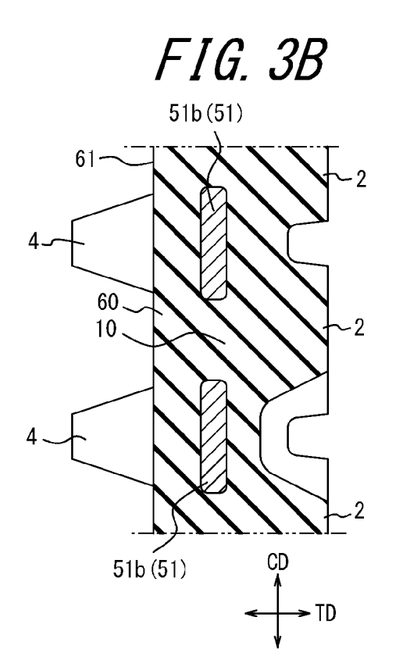
FIG. 3B is a cross-sectional view in the crawler circumferential direction along the 3A-3A line of the elastic crawler in FIG. 3A.
Figure 3C:
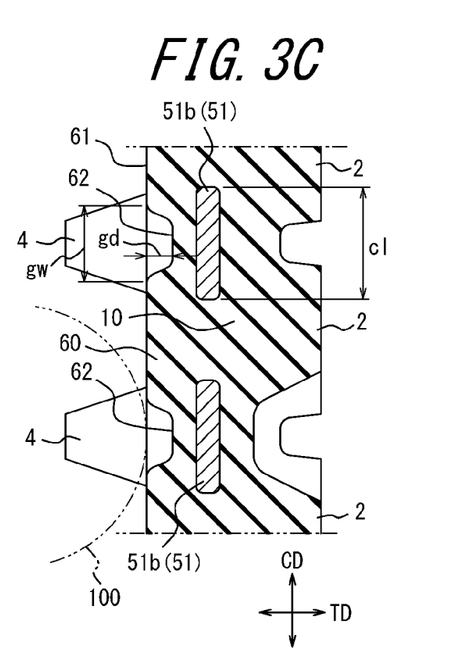
FIG. 3C is a cross-sectional view in the crawler circumferential direction along the 3C-3C line of the elastic crawler in FIG. 3A.
Figure 4A:
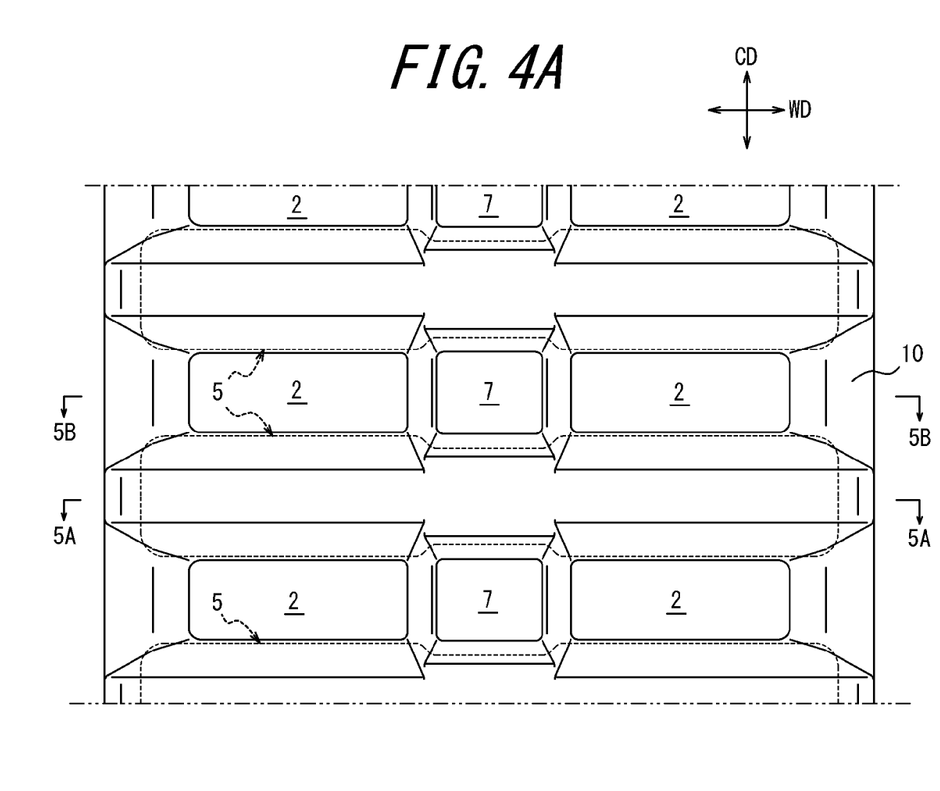
FIG. 4A is a plan view illustrating the outer circumferential surface of the crawler.
Figure 4B:
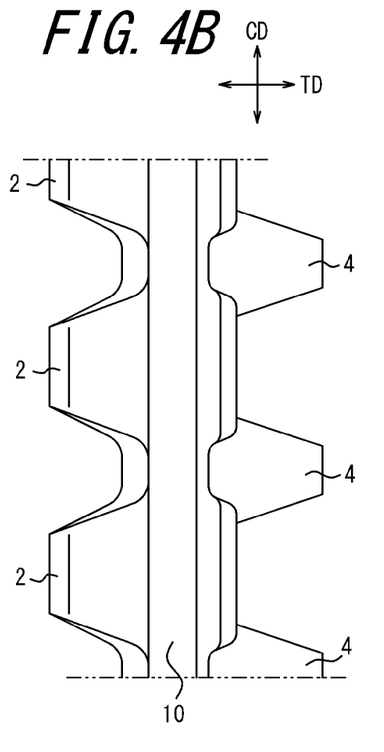
FIG. 4B is a side view of the elastic crawler in FIG. 4A from the right side.

In this embodiment, as illustrated in FIGS. 2A, 3A, and 3C, grooves 62 are provided on the crawler inner circumferential surface further outward, in the crawler width direction WD, than the pair of protrusions 52 (and therefore further outward in the crawler width direction WD than the pair of projections 4), in a crawler circumferential direction area corresponding to the core 5. Each groove 62 is formed in the portion of the elastic body 10 that is on the crawler inner circumferential side of the core body wings 51*b* and is recessed relative to crawler inner circumferential surface portions that are adjacent to the groove 62 on both sides in the crawler circumferential direction CD. In this example, in greater detail, within the area in the crawler circumferential direction CD corresponding to the core 5, the groove 62 is disposed in an intermediate portion that straddles the center of the core 5 in the crawler circumferential direction CD.

In this embodiment, as described above, each lug 2 is disposed so as to avoid the crawler circumferential direction CD area that corresponds to at least a portion (in this example, a portion) of the core 5 in the crawler circumferential direction CD, and grooves 62 are provided on the crawler inner circumferential surface further outward in the crawler width direction WD than the pair of projections 4, in a crawler circumferential direction area corresponding to the core 5.

As a result of repeated experiments to examine the effect that the position of the groove 62 has on the bending resistance in the crawler circumferential direction, I determined that the bending resistance in the crawler circumferential direction can be effectively suppressed by providing the groove 62 within the crawler circumferential direction area corresponding to the core 5. According to this embodiment, by providing such grooves 62, the bending resistance in the crawler circumferential direction can be effectively suppressed, thereby improving fuel efficiency and reducing the load on the body of the traveling equipment.

Furthermore, with this structure for the lugs 2 and the grooves 62, the amount of elastic solid (elastic solid volume) of the elastic body 10 in the crawler circumferential direction CD area corresponding to the core 5 can be reduced as, for example, compared to when the lugs 2 are disposed in the crawler circumferential direction CD area corresponding to the entire core 5, or when the grooves 62 are not provided in the crawler circumferential direction area corresponding to the core 5. As a result, it is possible to reduce the difference between the rigidity of the elastic crawler in the crawler thickness direction TD within the crawler circumferential direction CD area corresponding to the cores 5 and the rigidity of the elastic crawler in the crawler thickness direction TD within the crawler circumferential direction CD area between cores 5. Since this difference in rigidity can be reduced, the vertical vibration when the track rollers 100 pass over the track roller rolling surface 61 is reduced, thereby improving the ride comfort.

From the perspective of effectively reducing the bending resistance in the crawler circumferential direction CD, within the crawler circumferential direction CD area corresponding to the core 5, the length in the crawler circumferential direction CD of the portion where the root of the lug 2 (the edge on the crawler inner circumferential side) is not disposed (i.e. the interval between lugs 2) is preferably from 0.24 to 0.7 times the length cl of the core body wing 51*b* in the crawler circumferential direction CD.

In this example, as illustrated in FIG. 3C, in the crawler circumferential direction area corresponding to the center of the core 5 in the crawler circumferential direction CD and the nearby portions, the groove 62 is provided, and no lug 2 is present. Therefore, the amount of elastic solid of the elastic body 10 is greatly reduced as compared to other crawler circumferential direction areas. In this example, in at least a portion of the crawler circumferential direction area corresponding to the core 5, the crawler circumferential direction area corresponding to the grooves 62 and the crawler circumferential direction area corresponding to the lug 2 are configured so as not to overlap, thereby further reducing the bending resistance in the crawler circumferential direction and further reducing the vertical vibration.

In this example, as illustrated in FIG. 2A and FIG. 3A, each groove 62 straddles a crawler width direction position corresponding to the outer edge, in the crawler width direction WD, of the track roller rolling surface 61. In greater detail, the inner edge, in the crawler width direction WD, of the groove 62 in this example is positioned in a crawler width direction WD area between the outer edge, in the crawler width direction WD, of the projection 4 and the outer edge, in the crawler width direction WD, of the track roller rolling surface 61. Furthermore, the outer edge, in the crawler width direction WD, of the groove 62 is positioned further outward in the crawler width direction than the outer edge, in the crawler width direction WD, of the track roller rolling surface 61 (in this example, in greater detail, further outward in the crawler width direction than the outer edge, in the crawler width direction WD, of the core body wing 51*b*). The inner edge and the outer edge, in the crawler width direction WD, of the groove 62 refer to the inner edge and the outer edge, in the crawler width direction WD, at the opening of the groove 62 on the crawler inner circumferential side.

As in this example, at least a portion of the groove 62 in the crawler width direction WD (in this example, only a portion on the inside in the crawler width direction WD) is preferably provided on the track roller rolling surface 61 by recessing a portion of the track roller rolling portion 60. As a result, the second moment of area in the crawler circumferential direction CD with the cords 8 as the center of bending can be further reduced as compared to when the groove 62 is formed to the same depth as this example only in the crawler inner circumferential surface portion that is further outward in the crawler width direction WD than the track roller rolling surface 61. Hence, the bending resistance in the crawler circumferential direction CD can be further reduced.

As in this example, when at least a portion of the groove 62 in the crawler width direction WD (in this example, only a portion outward in the crawler width direction WD) is provided in the crawler inner circumferential surface portion that is further outward in the crawler width direction than the track roller rolling surface 61, then as a result of the portion of the groove 62 provided in the track roller rolling surface 61, the above-described reduction in the second moment of area and hence a reduction in the bending resistance in the crawler circumferential direction CD become possible, and additionally, the portion of the groove 62 provided in the crawler inner circumferential surface portion that is further outward in the crawler width direction WD than the track roller rolling surface 61 also allows a reduction of the bending resistance in the crawler circumferential direction CD. Accordingly, the bending resistance in the crawler circumferential direction can be further reduced overall.

In this example, the inner edge, in the crawler width direction WD, of the groove 62 is positioned between the edges, in the crawler width direction WD, of the track roller rolling surface 61. As a result, when the track rollers 100 pass over the area in the crawler circumferential direction CD corresponding to the groove 62, the track rollers 100 can be sufficiently supported by the portion of the track roller rolling surface 61 that is further inward in the crawler width direction WD than the groove 62. Hence, sinking of the track rollers 100 can be effectively suppressed.

As illustrated in FIG. 3C, the groove width of the groove 62 within the area in the crawler width direction WD corresponding to the track roller rolling surface 61 (the length, in the crawler circumferential direction CD, over which the groove 62 opens on the crawler inner circumferential side; the same holds below) is set so that when the track rollers 100 pass over the groove 62 provided on the track roller rolling surface 61, the track rollers 100 at least do not contact the groove bottom surface of the groove 62.

Furthermore, in order to keep the track rollers 100 from sinking in when the track rollers 100 pass over the area in the crawler circumferential direction CD corresponding to the core 5, the groove width gw of the groove 62 within the area in the crawler width direction WD corresponding to the track roller rolling surface 61 is preferably at most 1.5 times the groove depth gd of the groove 62 (the length in the crawler thickness direction TD; the same holds below), i.e. preferably gw≤1.5 gd. For the same reason, the groove depth gw of the groove 62 within the area in the crawler width direction WD corresponding to the track roller rolling surface 61 is preferably equal to or less than the length c1 of the core body wing 51b in the crawler circumferential direction CD (gw≤c1).

On the other hand, in order to reduce the bending resistance in the crawler circumferential direction CD sufficiently, the groove width gw of the groove 62 is preferably at least 0.3 times the groove depth gd of the groove 62 (0.3 gd≤gw). For the same reason, the groove depth gw of the groove 62 is preferably at least 0.24 times the length cl of the core body wing 51b in the crawler circumferential direction CD (0.24 cl≤gw).

In this example, as illustrated in FIG. 2A, the groove bottom surface of the groove 62 extends in the crawler width direction WD from i) a crawler width direction position between the outer edge of the projection 4 in the crawler width direction WD and the outer edge of the track roller rolling surface 61 in the crawler width direction WD to ii) the outer edge portion of the elastic crawler in the crawler width direction WD.

The inner edge, in the crawler width direction WD, of the track roller rolling surface 61 may be positioned further outward in the crawler width direction than the edge, in the crawler width direction WD, of the projection 4. In this case, a crawler inner circumferential surface portion that is more recessed than the track roller rolling surface 61 towards the crawler outer circumferential side is formed between the inner edge, in the crawler width direction WD, of the track roller rolling surface 61 and the outer edge, in the crawler width direction WD, of the projection 4.

In this example, as illustrated in FIG. 3A, the groove width of the groove 62 (the length, in the crawler circumferential direction CD, over which the groove 62 opens on the crawler inner circumferential side) on the inside, in the crawler width direction WD, of the outer edge, in the crawler width direction WD, of the track roller rolling surface 61 is greater than the groove width of the groove 62 on the outside, in the crawler width direction WD, of the outer edge, in the crawler width direction WD, of the track roller rolling surface 61.

In this example, as illustrated in FIG. 3A, in plan view of the crawler inner circumferential surface, the protrusions of the groove 62 in plan view are not angled, but rather formed as curves (i.e. are rounded). As a result, as compared to when the protrusions of the groove 62 in plan view are angled, the effect of distortion occurring in the protrusions when a bending force in the crawler circumferential direction CD acts on the elastic body 10 can be reduced, thereby improving the durability of the elastic body 10.

The groove 62 provided on one side relative to the center, in the crawler width direction WD, of the elastic crawler may have different dimensions or a different shape than the groove 62 provided on the other side relative to the center, in the crawler width direction WD, of the elastic crawler. The groove 62 may alternatively be provided on only one side relative to the center, in the crawler width direction WD, of the elastic crawler.

Embodiment 2

FIGS. 4A to 6C illustrate an elastic crawler according to Embodiment 2 and respectively correspond to FIGS. 1A to 3C. The elastic crawler of this embodiment is described focusing on the differences from the elastic crawler of Embodiment 1.

Figure 5A:
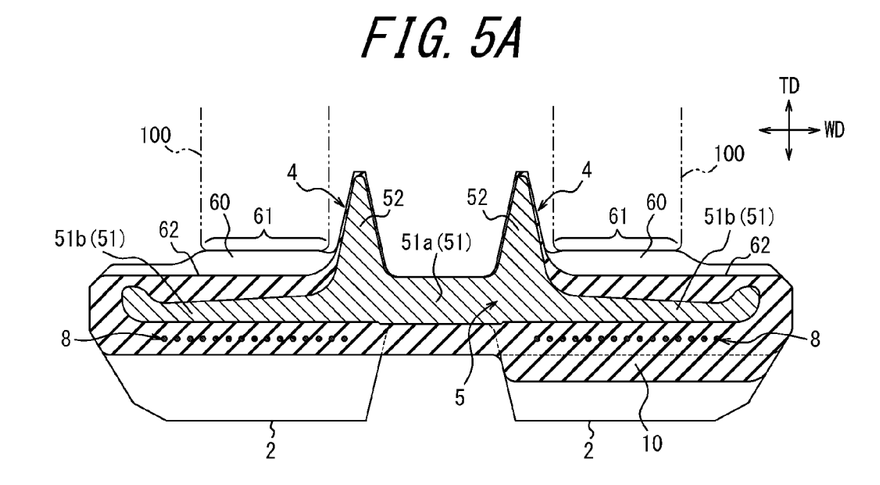
FIG. 5A is a cross-sectional view in the crawler width direction along the 5A-5A line of the elastic crawler in FIG. 4A.
Figure 5B:
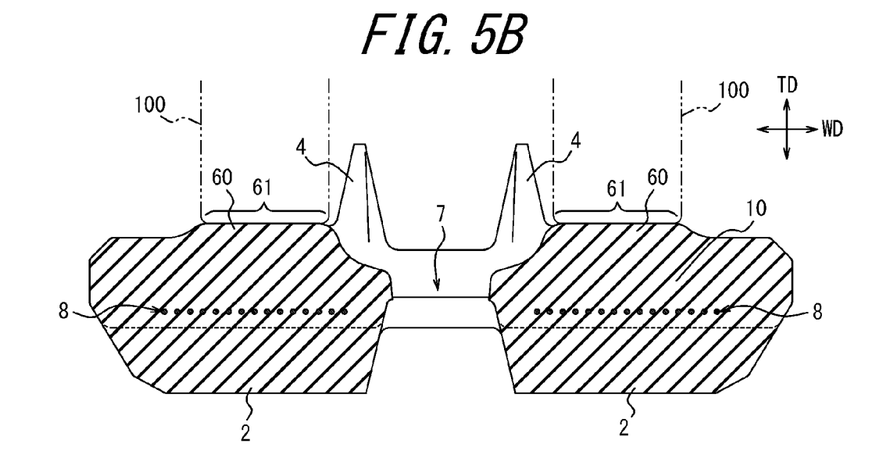
FIG. 5B is a cross-sectional view in the crawler width direction along the 5B-5B line of the elastic crawler in FIG. 4A.
Figure 6A:
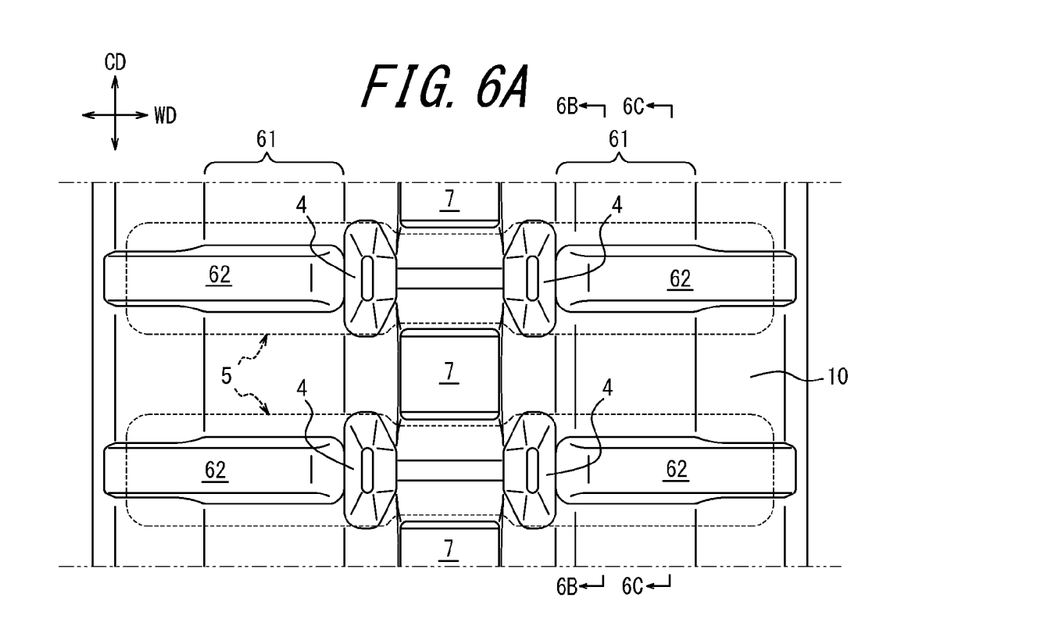
FIG. 6A is a plan view illustrating the inner circumferential surface of the elastic crawler in FIGS. 4A and 4B.

As illustrated in FIGS. 5A and 6A, the inner edge, in the crawler width direction WD, of the groove 62 in this example is at a crawler width direction position corresponding to the outer edge, in the crawler width direction, of the protrusion 52 (or the projection 4). Furthermore, the outer edge, in the crawler width direction WD, of the groove 62 is positioned further outward in the crawler width direction than the outer edge, in the crawler width direction WD, of the track roller rolling surface 61 (in greater detail, further outward in the crawler width direction than the outer edge, in the crawler width direction WD, of the core body wing 51b). Accordingly, the groove 62 extends in the crawler width direction WD along the entire length of the track roller rolling surface 61 in the crawler width direction WD and straddles the crawler width direction WD position corresponding to the outer edge, in the crawler width direction WD, of the track roller rolling surface 61. With the elastic crawler of this embodiment, the groove 62 extends longer in the crawler width direction WD than in the elastic crawler of Embodiment 1, thereby further suppressing the bending resistance in the crawler circumferential direction CD.

Figures 6B, 6C:
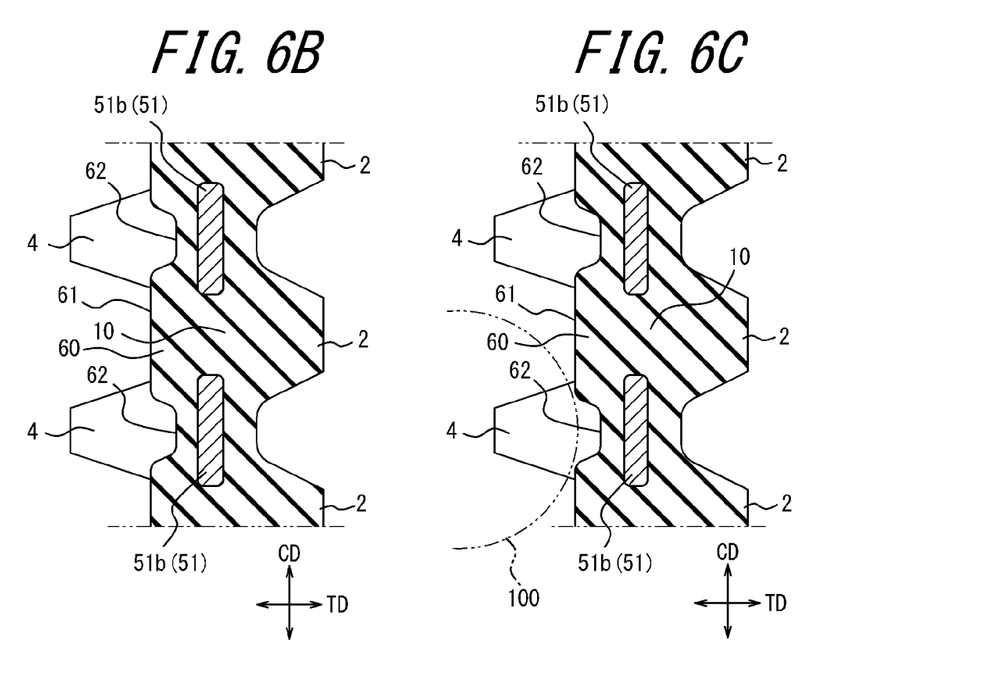
FIG. 6B is a cross-sectional view in the crawler circumferential direction along the 6B-6B line of the elastic crawler in FIG. 6A.
FIG. 6C is a cross-sectional view in the crawler circumferential direction along the 6C-6C line of the elastic crawler in FIG. 6A.

Furthermore, as illustrated in FIG. 6C, the surface of the lug 2 on the crawler outer circumferential side (the ground contact surface) in this example is positioned only in the crawler circumferential direction area between cores 5 that are adjacent in the crawler circumferential direction CD. In other words, the crawler circumferential direction area corresponding to the surface of the lug 2 on the crawler outer circumferential side (the ground contact surface) and the crawler circumferential direction area corresponding to the core 5 do not overlap. With the elastic crawler of this embodiment, as compared to the elastic crawler of Embodiment 1, the extending length of the groove 62 in the crawler width direction WD is longer, as described above, and the amount of elastic solid of the lug 2 located in the crawler circumferential direction CD area corresponding to the core 5 is further reduced. Therefore, the amount of elastic solid of the elastic body 10 in the crawler circumferential direction CD area corresponding to the core 5 can be further reduced, thereby further reducing the vertical vibration.

In the elastic crawlers of the above-described examples, the track roller rolling portion 60 (and hence the track roller rolling surface 61) may be disposed further inward, in the crawler width direction WD, than the pair of protrusions 52. In this case as well, a portion of the groove 62 may be formed by recessing the track roller rolling portion 60 disposed further inward, in the crawler width direction WD, than the pair of protrusions 52.

In the elastic crawlers of the above-described examples, it suffices for the core 5 to include at least a pair of (i.e. two) protrusions 52 arranged in the crawler width direction WD on the core body 51, but the core 5 may include three or more protrusions 52. For example, the core 5 may include two each of the protrusions 52 on either side of the center, in the crawler width direction WD, of the elastic crawler for a total of four protrusions 52.

INDUSTRIAL APPLICABILITY

The elastic crawler of this disclosure can be used in agricultural machinery (such as combines) and other traveling equipment.

The invention claimed is:

1. An elastic crawler comprising:
   an endless elastic body having an outer circumferential surface and an inner circumferential surface;
   a plurality of cores embedded in the elastic body and arranged at intervals in a crawler circumferential direction, each core including a core body extending in a crawler width direction and a pair of protrusions protruding from the core body towards a crawler inner circumferential side and facing each other in the crawler width direction;
   lugs provided on the outer circumferential surface of the elastic body, each of the lugs being disposed so as to avoid a crawler circumferential direction area corresponding to at least a portion of the core in the crawler circumferential direction; and
   grooves provided on the inner circumferential surface of the elastic body, each of the grooves being positioned outward in the crawler width direction from the pair of protrusions and within a crawler circumferential direction area corresponding to the core in a crawler thickness direction, wherein crawler inner circumferential surface portions are provided on the inner circumferential surface adjacent to the groove on both sides in the crawler circumferential direction, and each of the grooves is recessed inward from the adjacent crawler inner circumferential surface portions in the crawler thickness direction.

2. The elastic crawler of claim 1, further comprising:
   track roller rolling portions each provided on the elastic body further inside or outside in the crawler width direction than the pair of protrusions, an end face of each of the track roller rolling portions on the crawler inner circumferential side forming a track roller rolling surface;
   wherein each of the track roller rolling portions protrudes more towards the crawler inner circumferential side than a crawler inner circumferential surface portion that is outward, in the crawler width direction, from the track roller rolling portion; and
   wherein a portion of each of the grooves is formed by recessing the track roller rolling portion.

3. The elastic roller of claim 2, wherein a portion of each of the grooves is provided in the crawler inner circumferential surface portion that is outward, in the crawler width direction, from the track roller rolling portion.

\* \* \* \* \*